(12) United States Patent
Stronck

(10) Patent No.: US 11,237,080 B2
(45) Date of Patent: Feb. 1, 2022

(54) MECHANICAL SEAL WITH INTEGRATED RFID SENSOR

(71) Applicant: A.W. CHESTERTON COMPANY, Groveland, MA (US)

(72) Inventor: John M. Stronck, North Andover, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 179 days.

(21) Appl. No.: 16/585,912

(22) Filed: Sep. 27, 2019

(65) Prior Publication Data

US 2020/0103310 A1 Apr. 2, 2020

Related U.S. Application Data

(60) Provisional application No. 62/737,623, filed on Sep. 27, 2018.

(51) Int. Cl.
*G01M 13/005* (2019.01)
*F16J 15/10* (2006.01)
*F16J 15/06* (2006.01)

(52) U.S. Cl.
CPC ......... *G01M 13/005* (2013.01); *F16J 15/064* (2013.01); *F16J 15/10* (2013.01)

(58) Field of Classification Search
CPC .. F16J 15/064; F16J 15/10; F16J 15/16; F16J 15/34; F16J 15/3492; G01M 13/005
See application file for complete search history.

(56) References Cited

U.S. PATENT DOCUMENTS

| 9,790,952 | B2 * | 10/2017 | Shamseldin | .......... G01M 3/002 |
| 2010/0106429 | A1 | 4/2010 | Horak | |
| 2016/0298796 | A1 * | 10/2016 | Anton | ..................... G01D 21/00 |
| 2019/0271419 | A1 * | 9/2019 | Anton | ................. F16L 19/0283 |

FOREIGN PATENT DOCUMENTS

| EP | 0 458 547 A2 | 11/1991 |
| EP | 0 886 088 A2 | 12/1998 |
| EP | 2 687 762 A2 | 1/2014 |
| JP | 2010 190651 A | 9/2010 |
| WO | 01/40756 A2 | 6/2001 |

OTHER PUBLICATIONS

International Search Report and Written Opinion, PCT/US2019/053472, dated Dec. 13, 2019, 11 pages.

* cited by examiner

*Primary Examiner* — Gilbert Y Lee
(74) *Attorney, Agent, or Firm* — Nelson Mullins Riley & Scarborough LLP; Anthony A. Laurentano

(57) ABSTRACT

A mechanical seal assembly comprising a gland assembly having first and second sensor openings and a sleeve assembly disposed about a shaft and disposed within the gland assembly. A first RFID sensor is disposed within the first sensor opening and a second RFID sensor is disposed within the second sensor opening, where the first RFID sensor is a high frequency RFID sensor and the second RFID sensor is an ultra high frequency RFID sensor.

6 Claims, 4 Drawing Sheets

MECHANICAL SEAL WITH INTEGRATED RFID SENSOR

RELATED APPLICATION

The present invention claims priority to provisional patent application Ser. No. 62/737,623, entitled MECHANICAL SEAL WITH INTEGRATED RFID SENSOR, and filed on Sep. 27, 2018, the contents of which are herein incorporated by reference.

FIELD OF THE INVENTION

The present invention relates to a mechanical seal assembly for sealing a shaft or a rod relative to a stationary housing component. This invention relates generally to mechanical seals, and more particularly relates to a mechanical seal that employs sensors.

BACKGROUND OF THE INVENTION

Conventional mechanical seal assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

Conventional mechanical seals including split mechanical seals are employed in a wide variety of mechanical apparatuses to provide a pressure-tight and fluid-tight seal. The mechanical seal is usually positioned about a rotating shaft that is mounted in and protruding from a stationary housing. The mechanical seal assembly is usually bolted to the outside of the housing at the shaft exit, thus preventing the loss of pressurized process fluid from the housing. Typical mechanical seals include face-type mechanical seals, which include a pair of sealing rings that are concentrically disposed about the shaft and are axially spaced from each other. The sealing rings each have sealing faces that are biased into sealing contact with each other by conventional biasing mechanisms, including biasing clips or springs. Usually, one seal ring remains stationary (i.e., the stationary seal ring) while the other ring is secured to the shaft and rotates therewith (i.e., the rotary seal ring). The mechanical seal prevents leakage of the pressurized process fluid to the external environment by biasing the seal ring sealing faces in sealing contact with each other. The rotary seal ring is usually mounted in a holder or sleeve assembly which is concentrically disposed about the equipment shaft. Likewise, the gland assembly may be solid or have a pair of gland halves that also secured together by a screw. The stationary sealing element is typically mounted within the gland assembly.

A common problem with maintaining mechanical seals is that they are often mounted in locations that are not easily accessible by maintenance personnel. Further, the commercial or industrial installation may employ a number of mechanical seals that require significant time on the part of the maintenance personnel to visually inspect.

SUMMARY OF THE INVENTION

An object of the present invention is to provide a mechanical seal that employs one or more sensors, such as a radio frequency identification (RFID) sensor, for sensing or detecting a selected parameter of the mechanical seal.

The present invention is directed to a mechanical seal assembly that employs a plurality of sensors, such as RFID sensors, operating at the same or different frequencies. The sensors can operate in one or more of the low frequency range, high frequency range, or one or more bands of the ultra high frequency range, or a combination of any of the foregoing frequency ranges.

According to one practice, the mechanical seal assembly of the present invention comprises a gland assembly having a housing that includes a plurality of sensor openings formed therein, where the plurality of sensor openings includes a first sensor opening and a second sensor opening, a sleeve assembly disposed about a shaft and disposed within the gland assembly, a rotary seal ring rotatably coupled to the sleeve assembly, a stationary seal ring disposed in operative contact with the rotary seal ring to form a seal therebetween, and a first sensor disposed within the first sensor opening and a second sensor disposed within the second sensor opening. According to a preferred practice, the first and second sensors are RFID sensors.

The first and second sensors can include one or more of a radio frequency identification (RFID) sensor, a temperature sensor, a pressure sensor, a motion sensor, and a humidity sensor. According to a preferred practice, the first sensor is a high frequency RFID sensor and the second sensor is an ultra high frequency RFID sensor. Further, the first and second sensor openings can be adjacent to each other or can be circumferentially separated or spaced apart from each other.

Further, the first and second sensors can be coated with a thermoplastic material, such as a polyether ether ketone (PEEK) material.

The present invention can also be directed to a mechanical seal assembly comprising a gland assembly having a housing that includes a plurality of sensor openings formed therein, wherein the plurality of sensor openings includes a first sensor opening and a second sensor opening, a sleeve assembly disposed about a shaft and disposed within the gland assembly, a first RFID sensor disposed within the first sensor opening and a second RFID sensor disposed within the second sensor opening, wherein the first RFID sensor is a high frequency RFID sensor and the second RFID sensor is an ultra high frequency RFID sensor.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

The present invention provides a mechanical seal assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

As and if used herein, the terms "seal assembly" and "sealing assembly" are intended to include various types of sealing assemblies, including single seals, split seals, concentric seals, spiral seals, and other known seal and sealing assembly types and configurations.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and a seal assembly disposed proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

The mechanical seal assembly of an illustrative embodiment of the present invention may employ an improved rotary seal ring holder or sleeve for mounting and holding a rotary sealing member in a selected position within the mechanical seal assembly and/or an improved gland assembly for connecting stationary components of the mechanical seal assembly to stationary equipment and/or improved seal rings for sealing a process fluid within the stationary equipment.

Figure 1:
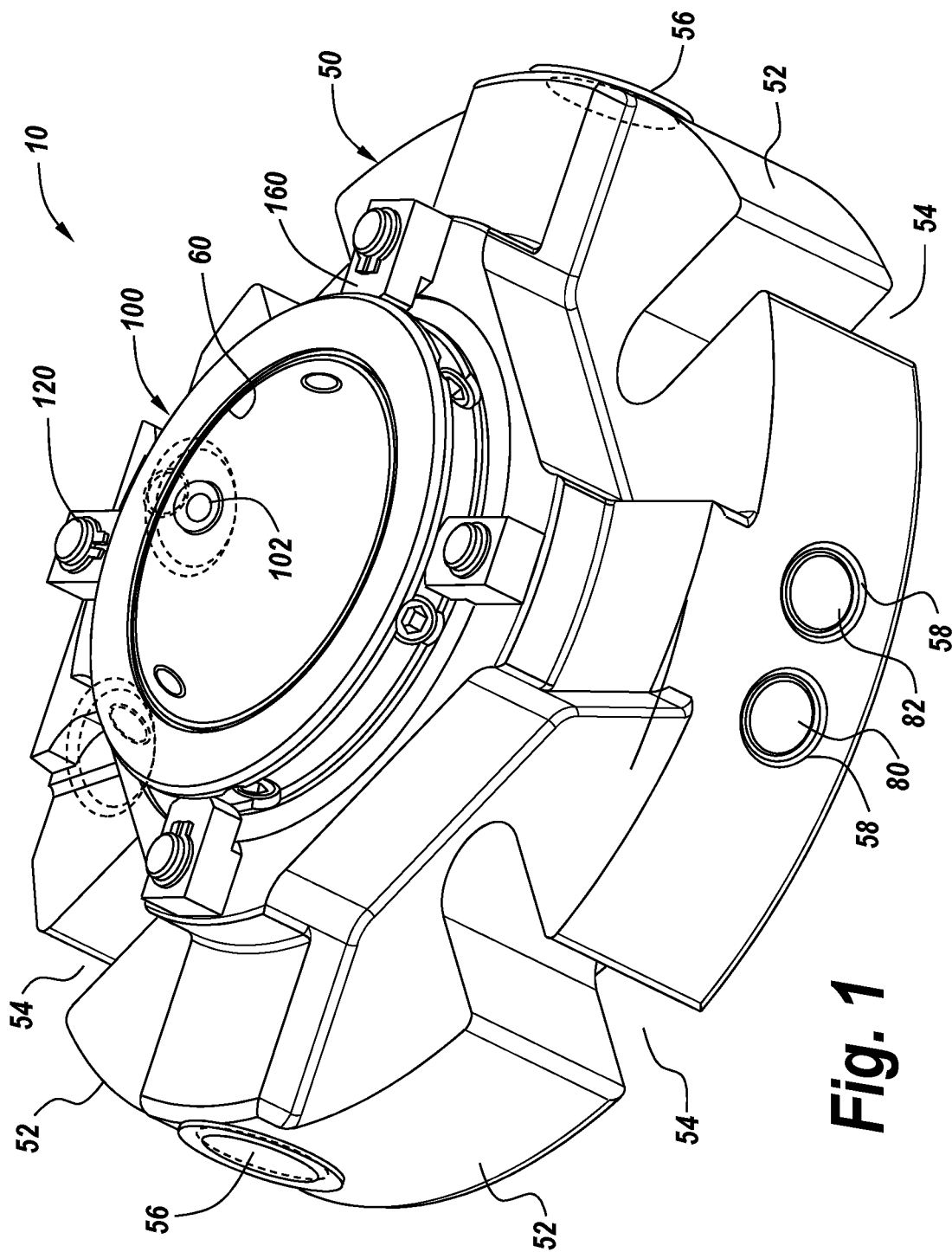
FIG. 1 is a perspective view of a mechanical seal assembly mounting multiple sensors in the gland assembly according to the teachings of the present invention.
Figure 2:
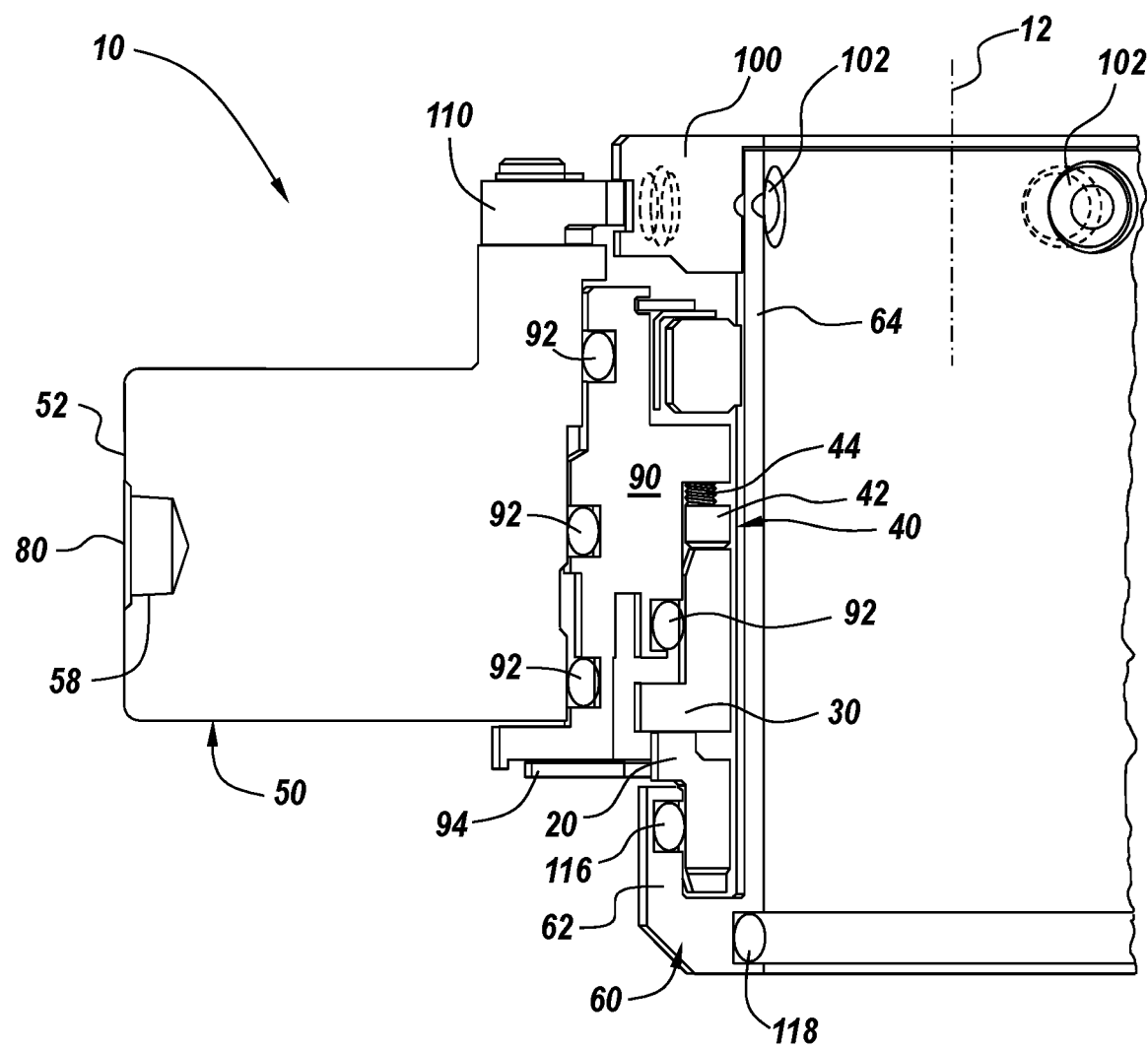
FIG. 2 is a cross-section view of the mechanical seal assembly of FIG. 1 according to the teachings of the present invention.
Figure 3:
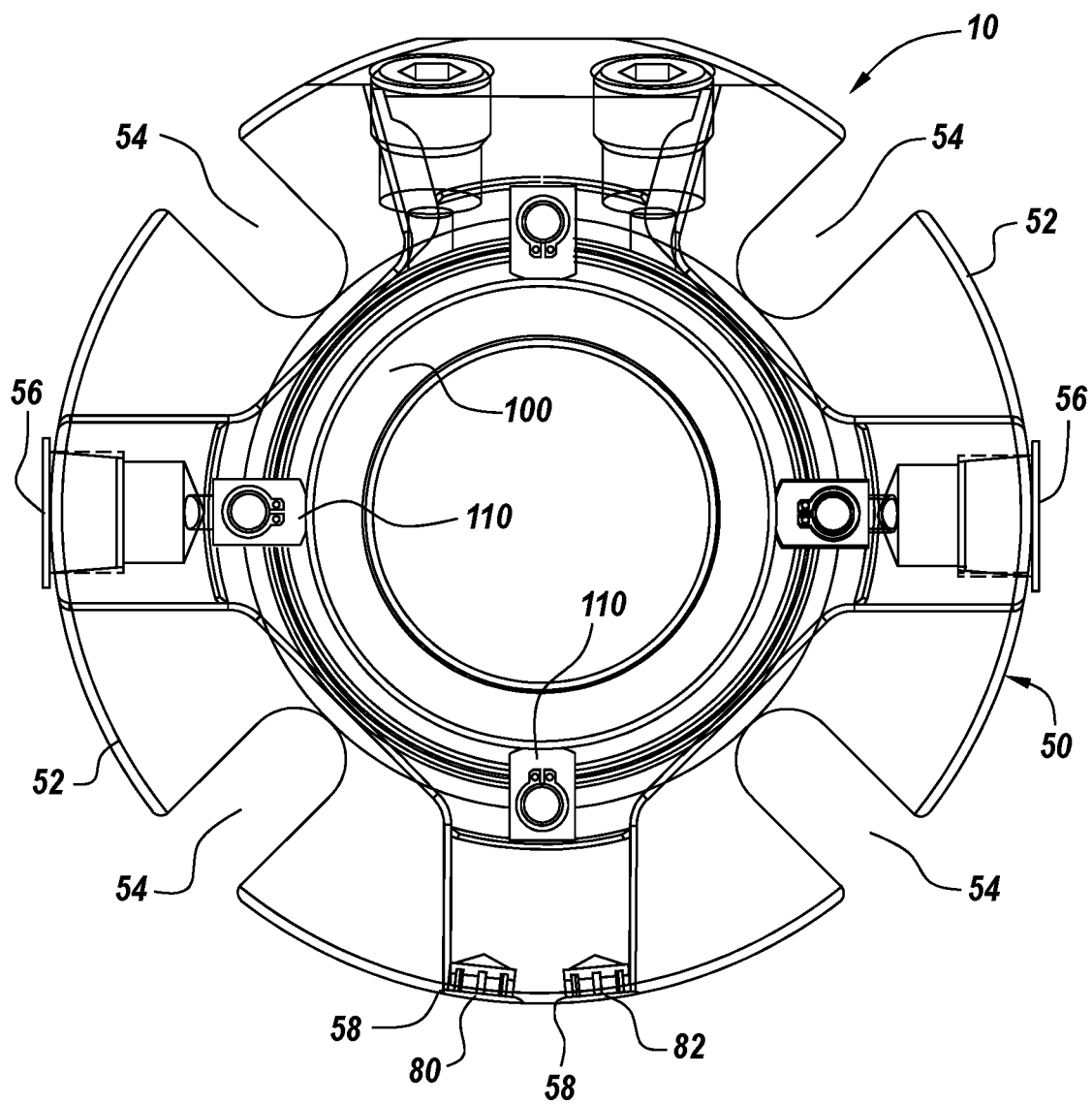
FIG. 3 is a top semi-transparent perspective view of the mechanical seal assembly of FIG. 1 showing the sensor locations according to the teachings of the present invention.

FIGS. 1-3 depict a mechanical seal assembly 10 according to a first embodiment of the present invention. The mechanical seal assembly 10 is preferably concentrically disposed about a shaft (not shown) that extends along a first axis 12 and is secured to an external wall of stationary equipment, such as a pump or other mechanical device. The shaft may be mounted, at least partly, within or adjacent to the stationary housing. The mechanical seal assembly 10 can be constructed to provide a fluid-tight seal, thereby preventing a process medium (e.g., fluid) from escaping the stationary equipment. The fluid-tight seal is achieved by sealing members, illustrated as a pair of seal rings 20 and 30. The illustrated seal rings include a first or rotary/rotating seal ring 20 and a second or stationary seal ring 30 that can be disposed in operative sealing contact with each other to form a seal therebetween. Each seal ring 20 and 30 has a smooth arcuate sealing surface that are biased into sealing contact with each other by a biasing assembly 40, that can include one or more biasing rings 42 and a plurality of biasing springs 44. The seal rings 20 and 30 can be solid or can be split into a pair of seal ring segments, respectively, to facilitate easy installation of the mechanical seal assembly. The sealing surfaces of the seal rings 20, 30 provide a fluid-tight seal operable under a wide range of operating conditions.

The mechanical seal assembly 10 can also include a gland assembly 50 and a holder or sleeve assembly 60 that seats within the gland assembly 50. The sleeve assembly 60 can have any selected shape or configuration, and in the illustrated embodiment is formed as a sleeve that is disposed about and is rotatably coupled to the shaft. The sleeve assembly is disposed within the interior space formed by the gland assembly. The sleeve assembly 60 has a sleeve portion 64 and a flange portion 62 that defines a space for receiving and retaining the rotary seal ring 20. The sleeve assembly 60 can have any selected number of grooves formed thereon for seating one or more sealing elements. For example, the sleeve assembly 60 seats sealing elements 116, 118 within corresponding grooves for sealing a process fluid in the stationary equipment.

The illustrated mechanical seal assembly 10 can also include a carrier element 90 that is mounted between the seal rings 20, 30 and the gland assembly 50. The carrier element is adapted to move axially along the first axis 12 and seats a plurality of sealing elements 92, shaped as O-rings, for sealing the process fluid in the stationary equipment from atmosphere. A flat gasket element 94 is seated within a corresponding groove formed in the carrier element 90 and seals the carrier 90 relative to the stationary equipment. The carrier element 90 can also mount a restriction bushing that is disposed in a groove in the carrier and which faces or contacts the sleeve portion 64.

The mechanical seal assembly 10 further includes a lock ring 100 that is coupled to an axial outer portion of the sleeve portion 64 of the sleeve assembly 60. The lock ring 100 serves to lock the sleeve assembly 60 and the associated seal rings 20, 30 within the mechanical seal. A plurality of spacing elements 110 can be used to engage a groove formed in the lock ring 100 so as to position selected elements, such as the sleeve assembly 60, the seal rings 20, 30, and the carrier element 90, within the mechanical seal assembly 10. The spacing elements can be configured to rotate or turn away from the lock ring during seal use. The spacing elements are described in U.S. Pat. No. 6,935,632, to the assignee hereof, the contents of which are herein incorporated by reference. The sleeve assembly 60 can also include a plurality of centering elements 102 for centering the sleeve assembly 60 and hence the seal rings 20, 30 relative to the shaft.

The gland assembly 50 and the sleeve assembly 60 can be solid or can be split into a pair of arcuate segments to facilitate easy assembly and installation of the mechanical seal assembly. The illustrated gland assembly 50 has a general housing having an outer housing portion 52 that has a plurality of bolt openings 54 formed therein. The bolt openings 54 are adapted to seat a bolt (not shown) that secures the gland assembly 50 and hence the mechanical seal assembly 10 to the stationary equipment. The gland assembly 50 can also include one or more fluid openings 56 formed therein between inner and outer gland housing surfaces for allowing communication between an inner region of the gland and hence the seal with an externally supplied fluid. The fluid openings 56 thus allow communication between the process fluid in the stationary equipment and an external environment or an external fluid source that can be coupled to the fluid openings. The fluid openings 56 can be configured to receive a selected fluid therein, such as a barrier or flushing fluid.

The outer housing portion 52 also includes one or more, and preferably a pair, of sensor openings 58, each of which is sized and configured for mounting a sensor 80, 82. The sensor openings can have any selected configuration, and can be perpendicular to the axis 12 or can be slanted or transverse relative to the axis 12. The sensors 80, 82 can be any selected type of sensor, including a radio frequency identification (RFID) sensor, a temperature sensor, a pressure sensor, a motion sensor, a humidity sensor, and the like. According to one embodiment, the sensors are RFID sensors or can be another type of sensor that is radio-frequency enabled to thus act and function as an RFID sensor. The RFID sensors 80, 82 can store identification information associated with the tag and in turn can be used to identify the specific mechanical seal assembly 10 and thus the location of the stationary equipment. The sensors can also have any selected type of information stored therein based on the system and user requirements. The RFID sensors 80, 82 can be read only sensors, read/write sensors, or a combination of both. A suitable example of an RFID sensor suitable for use with the present invention is manufactured and sold by Infochip, USA. Further, the RFID sensors can be passive RFID sensors that do not include a local power source and instead relies upon the electromagnetic energy of an RFID reader, or can be active RFID sensors that includes a local power source, or a combination of both. The RFID sensors are configured to operate in connection with an RFID reader, as is known in the art.

Figure 4:
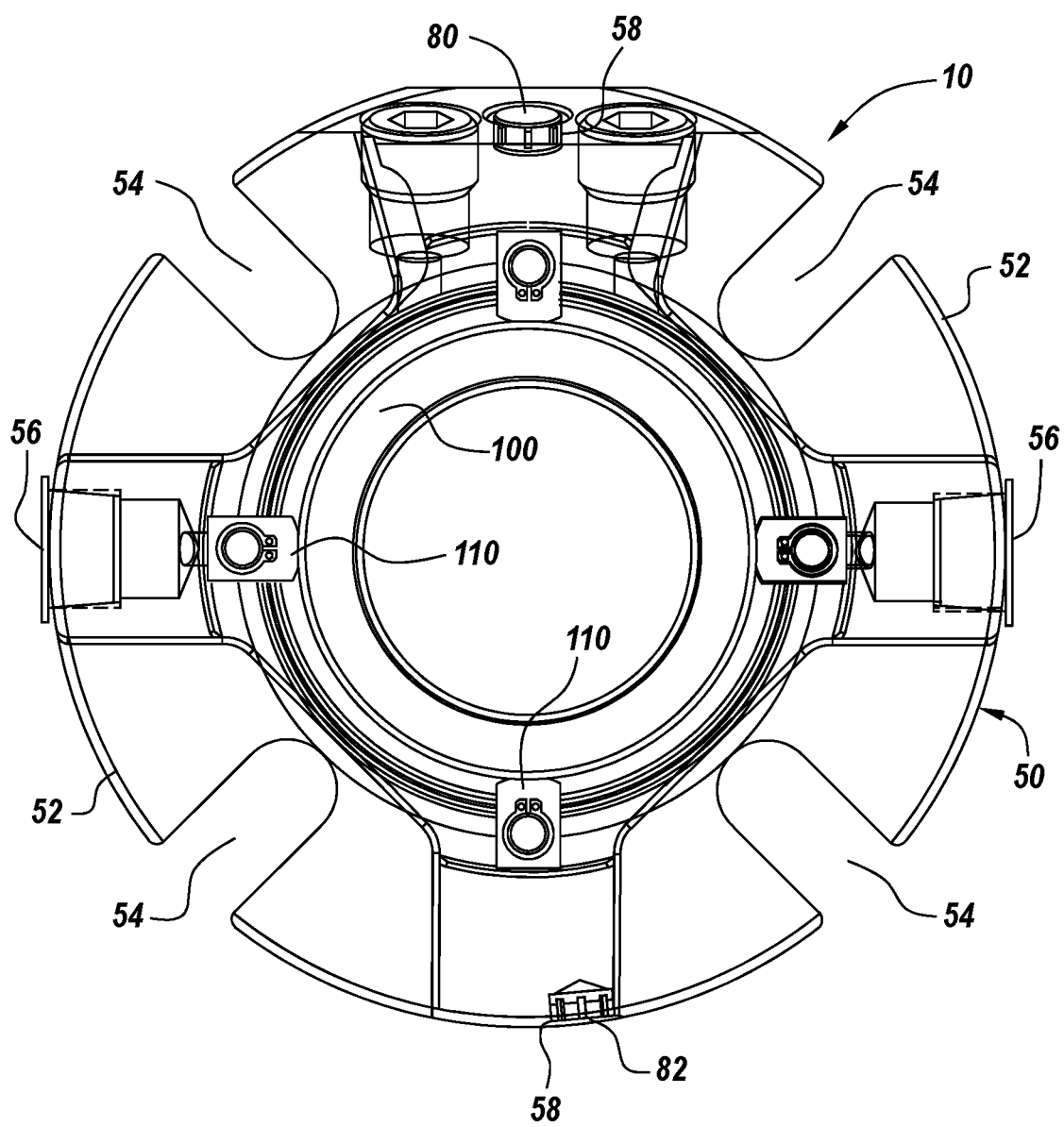
FIG. 4 is a top semi-transparent perspective view of a second embodiment of the mechanical seal assembly showing the sensors mounted at different locations according to the teachings of the present invention.

The sensor openings 58 can be formed at selected locations in the outer gland housing portion 52 of the gland assembly 50 depending upon the type of mechanical seal and the specific client application. For example, the sensor openings can be placed in the mechanical seal assembly based on the accessibility of the seal and sensors after mounting as well as the robustness of the sensor signal when installed. According to a preferred embodiment, the gland assembly 50 can have a pair of sensor openings 58, 58 and the sensor openings can be formed at any selected location in the gland, and preferably are formed adjacent to each other, FIG. 3. FIG. 4 illustrates a second embodiment of the present invention where the sensors 80, 82 are mounted at circumferentially different locations in the outer housing portion 52 of the gland assembly 50, such that the openings are spatially separated from each other. The gland assembly 50 can also include one or more fluid openings 56 formed therein between inner and outer gland housing surfaces for allowing communication between an inner region of the gland and hence the seal with an externally supplied fluid. The fluid openings 56 thus allow communication between the process fluid in the stationary equipment and an external environment or an external fluid source that can be coupled to the fluid openings. The fluid openings 56 can be configured to receive a selected fluid therein, such as a barrier or flushing fluid. Those of ordinary skill in the art will readily recognize that the sensors can be mounted at locations other than in the gland assembly 50. For example, the sensors can be mounted in an interior portion of the gland assembly adjacent to or mounted on or in another seal component, such as the sleeve assembly, the seal rings, the carrier, the lock ring, and the like. The skilled artisan will also recognize based on the current teachings that any suitable number of sensors can be employed in connection with the mechanical seal assembly.

The RFID sensors 80, 82 can be coated in any selected material for protecting the sensor from the external environment. According to one practice, each of the sensors 80, 82 can be coated in plastic material, such as a thermoplastic material. Once such material can be a polyether ether ketone (PEEK) material. The material can be selected to allow for chemical compatibility, optimal sensor installation and overall mechanical robustness.

The sensors 80, 82 can be configured to radiate or operate at selected wavelengths or frequencies, and if two or more sensors are mounted within the gland assembly 50 of the mechanical seal assembly 10, the sensors preferably radiate at different frequencies, such as at a low frequency (e.g., between about 120 KHz to 140 KHz), a high frequency, and/or an ultra high frequency, or a combination thereof. For example, and according to one embodiment, one RFID sensor 80 can radiate at a high frequency (e.g., between about 12-15 MHz) and the other sensor can radiate at an ultra high frequency (e.g., between about 850-960 MHz or between about 2.4-2.5 GHz). According to another practice, the sensors can operate at the same frequency or operate at different frequency ranges within the low, high and ultrahigh frequency ranges.

The RFID sensors 80, 82 can be placed and secured within the sensor openings 58, 58 by any known technique, including frictional or press fit techniques, or can be secured therein with an adhesive.

As previously noted, the sensor openings formed in the gland of the mechanical seal can also be canted or angled at selected angles depending upon the type of mechanical seal. The sensor opening locations can be selected so as to optimize or compliment seal orientation combinations. Further, the mechanical seals can include specifically designed slot depths and opening diameters that enable open-ended insertion of the RFID type sensors, while concomitantly preventing accidental walkout of the sensors.

The RFID sensors can also be selected so as to exhibit proper levels of chemical robustness by being chemically compatible with the operating environment of the seal. This allows open ended use and installation of the RFID type sensors in the various types of mechanical seals, without negatively impacting or interfering with the radio frequency signals emitted or received by the sensors. This enables relatively easy readability of the sensor signals and the ability of the signals to be read at farther distances without deleterious interference.

Another advantage is that the RFID sensors allows the operator to obtain signals therefrom without having to approach the moving and potentially dangerous equipment.

Certain components of the illustrated mechanical seal assembly 10 of the present invention are similar to the mechanical seal assemblies described in U.S. Pat. Nos. 5,571,268, 7,708,283, and 10,352,457, to the assignee hereof, the contents of which are herein incorporated by reference. The mechanical seal assembly of the present invention includes a mechanical seal, which can include a mechanical seal of any type, including solid seals as illustrated, split seals, spiral seals, tandem seals, cartridge seal, EPS seals, balanced seals, unbalanced seals, pusher seals, labyrinth seals, face seals, hydraulic seals, pneumatic seals, and the like.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

I claim:

1. A mechanical seal assembly, comprising
   a gland assembly having a housing that includes a plurality of sensor openings formed in an outer surface of the housing, wherein the plurality of sensor openings includes a first sensor only opening and a second sensor only opening, and wherein the first and second sensor openings have a depth that does not extend to an inner surface of the housing,
   a sleeve assembly disposed about a shaft and disposed within the gland assembly,
   a rotary seal ring rotatably coupled to the sleeve assembly,
   a stationary seal ring disposed in operative contact with the rotary seal ring to form a seal therebetween, and
   a first sensor disposed within the first sensor only opening and a second sensor disposed within the second sensor only opening,
   wherein the first and second sensors are RFID sensors, and wherein the first sensor is a high frequency RFID sensor and the second sensor is an ultr high frequency RFID sensor.

2. The mechanical seal assembly of claim 1, wherein the first and second sensor openings are formed adjacent to each other.

3. The mechanical seal assembly of claim 1, wherein the first and second sensor openings are circumferentially separated from each other.

4. The mechanical seal assembly of claim 1, wherein the first and second sensors are coated with a thermoplastic material.

5. The mechanical seal assembly of claim 4, wherein the thermoplastic material is a polyether ether ketone (PEEK) material.

6. A mechanical seal assembly, comprising
   a gland assembly having a housing that includes a plurality of sensor openings formed in an outer surface of the housing, wherein the plurality of sensor openings includes a first sensor only opening and a second sensor only opening, and wherein the first and second sensor only openings have a depth that does not extend to an inner surface of the housing,
   a sleeve assembly disposed about a shaft and disposed within the gland assembly,
   a first sensor disposed within the first sensor opening and a second sensor disposed within the second sensor opening,
   wherein the first sensor and the second sensor are selected from the group consisting of a temperature sensor, a pressure sensor, a motion sensor, a humidity sensor, and an RFID sensor.

* * * * *